(12) United States Patent
Takeshita et al.

(10) Patent No.: US 9,376,990 B2
(45) Date of Patent: Jun. 28, 2016

(54) EVAPORATED FUEL TREATMENT APPARATUS

(71) Applicant: AISAN KOGYO KABUSHIKI KAISHA, Obu-shi, Aichi (JP)

(72) Inventors: Shinya Takeshita, Chiryu (JP); Norihisa Yamamoto, Aichi-gun (JP)

(73) Assignee: Aisan Kogyo Kabushiki Kaisha (JP)

(*) Notice: Subject to any disclaimer, the term of this patent is extended or adjusted under 35 U.S.C. 154(b) by 137 days.

(21) Appl. No.: 14/321,986

(22) Filed: Jul. 2, 2014

(65) Prior Publication Data

US 2015/0007799 A1 Jan. 8, 2015

(30) Foreign Application Priority Data

Jul. 4, 2013 (JP) ................................ 2013-141032

(51) Int. Cl.
| | |
|---|---|
| F02M 25/08 | (2006.01) |
| B01D 53/04 | (2006.01) |
| B67D 7/04 | (2010.01) |

(52) U.S. Cl.
CPC ....... *F02M 25/0854* (2013.01); *B01D 53/0407* (2013.01); *B01D 2253/102* (2013.01); *B01D 2259/4516* (2013.01); *B01D 2259/4566* (2013.01); *B67D 7/0476* (2013.01)

(58) Field of Classification Search
CPC . F02M 25/0854; F02M 25/08; F02M 25/089; F02M 2025/0881; F02M 2025/0863; F02M 35/0218; B01D 2259/4516; B01D 2253/102; B01D 2257/702; B01D 53/02; B01D 53/0415; B01D 2259/40086; B01D 2259/41; B01D 53/0454
USPC ............ 123/516, 518–524, 461; 96/121, 131, 96/132, 152; 55/418
See application file for complete search history.

(56) References Cited

U.S. PATENT DOCUMENTS

| | | | |
|---|---|---|---|
| 5,207,808 A | * | 5/1993 | Haruta et al. ................... 96/131 |
| 5,538,543 A | | 7/1996 | Watanabe et al. |

(Continued)

FOREIGN PATENT DOCUMENTS

| | | |
|---|---|---|
| JP | H7-139442 A | 5/1995 |
| JP | 2002-030998 | 1/2002 |

(Continued)

OTHER PUBLICATIONS

Office Action, issued Jun. 2, 2015, in Korean Patent Application No. 10-2014-0077172.

(Continued)

*Primary Examiner* — Stephen K Cronin
*Assistant Examiner* — Long T Tran
(74) *Attorney, Agent, or Firm* — Wood, Phillips, Katz, Clark & Mortimer (57) ABSTRACT

An evaporated fuel treatment apparatus includes a passage circulating fluid being formed therein, a tank port and a purge port being formed at one end side of the passage, and an atmosphere port being formed at another end side of the passage. At least four adsorbent layers in which adsorbent adsorbing fuel components is filled are provided in the passage. The evaporated fuel treatment apparatus has a main adsorbent layer and a region provided on an atmosphere port side of the main adsorbent layer. At least three adsorbent layers that are different from the main adsorbent layer, and separating portions that separate the adsorbent layers which are adjacent to each other are provided in the region. The volume of at least one separating portion in the region is made larger than a total of the volumes of adsorbent layers that sandwich the separating portion therebetween.

8 Claims, 5 Drawing Sheets

(56) References Cited

U.S. PATENT DOCUMENTS

| | | | | |
|---|---|---|---|---|
| 5,564,398 | A * | 10/1996 | Maeda et al. | 123/520 |
| 6,460,516 | B2 * | 10/2002 | Kimoto et al. | 123/519 |
| 7,294,179 | B2 * | 11/2007 | Kim et al. | 96/121 |
| 7,998,257 | B2 * | 8/2011 | Makino et al. | 96/132 |
| 2002/0020398 | A1 | 2/2002 | Kimoto et al. | |
| 2007/0119306 | A1 | 5/2007 | Yamada et al. | |
| 2011/0315126 | A1 * | 12/2011 | Yoshida et al. | 123/519 |
| 2012/0234301 | A1 * | 9/2012 | Takamatsu | 123/519 |
| 2012/0304865 | A1 * | 12/2012 | Sugiura et al. | 96/131 |
| 2013/0160651 | A1 | 6/2013 | Mani | |
| 2013/0183207 | A1 * | 7/2013 | Kimoto et al. | 422/255 |

FOREIGN PATENT DOCUMENTS

| | | |
|---|---|---|
| JP | 2002-235610 | 8/2002 |
| JP | 2007-146793 | 6/2007 |
| JP | 2012-251431 | 12/2012 |
| JP | 2012-251431 A | 12/2012 |

OTHER PUBLICATIONS

Office Action, issued Oct. 1, 2015, in Korean Patent Application No. 10-2014-0077172.

Office Action, mailed Apr. 5, 2016, in counterpart Chinese Patent Appln. No. 201410315565.9.

* cited by examiner

FIG. 5 ly, to prevent evaporated fuel from being released to the atmosphere from a fuel tank of an automobile or the like, an evaporated fuel treatment apparatus (hereunder, also referred to as a "canister") is used that temporarily adsorbs fuel components contained in evaporated fuel.

EVAPORATED FUEL TREATMENT APPARATUS

BACKGROUND OF THE INVENTION

1. Field of the Invention

The present invention relates to an evaporated fuel treatment apparatus.

Background Art

Conventionally, to prevent evaporated fuel from being released to the atmosphere from a fuel tank of an automobile or the like, an evaporated fuel treatment apparatus (hereunder, also referred to as a "canister") is used that temporarily adsorbs fuel components contained in evaporated fuel.

As such the canister, there is known a canister that has a casing in which a passage circulating a fluid is formed, a tank port and a purge port are formed at one end of the passage, and an atmosphere port is formed at the other end thereof. Inside the passage of the casing, four adsorbent layers filled with activated carbon are arranged in series, and a space in which activated carbon is not filled is formed between adjacent adsorbent layers (see JP-A-2007-146793).

In the canister according to the conventional technology, because a volume of a separating portion is less than a volume of adjacent adsorbent layers and the separating portion does not have an adequate volume, there has been the problem that diffusion of fuel components to the atmosphere port side cannot be adequately suppressed by the separating portion, and it is difficult to improve the performance with respect to preventing blow-by of fuel components to the atmosphere.

SUMMARY OF THE INVENTION

Thus, an object of the present invention is to provide an evaporated fuel treatment apparatus that can reduce blow-by of fuel components to the outside from an atmosphere port more than the conventional canister.

The present invention is provided with a main adsorbent layer and, in a region on an atmosphere port side of the main adsorbent layer, three or more adsorbent layers which are different from the main adsorbent layer as well as separating portions that separate the adsorbent layers that are adjacent to each other. By making the volume of at least one separating portion among these separating portions larger than the total of the volumes of adsorbent layers that sandwich the separating portion therebetween, diffusion from the separating portion to the atmosphere port side can be suppressed more than in the conventional canister, and the amount of blow-by to the atmosphere can be decreased and the blow-by performance can be improved in comparison to the conventional canister.

In one form, the invention is directed to an evaporated fuel treatment apparatus in which a passage circulating fluid is formed. A tank port and a purge port are formed at one end of the passage. An atmosphere port is formed at the other end of the passage. Four or more adsorbent layers in which adsorbent adsorbing fuel component is filled are provided in the passage. The evaporated fuel treatment apparatus has a main adsorbent layer. A region is provided on an atmosphere port side of the main adsorbent layer, wherein three or more adsorbent layers that are different from the main adsorbent layer are provided. Separating portions are provided in the region to separate adjacent adsorbent layer. A volume of at least one separating portion in the region is made larger than a total of volumes of the adsorbent layers that sandwich the separating portion therebetween.

In one form, with respect to two adsorbent layers that sandwich therebetween the separating portion that has a volume that is made larger than the total of the volumes of the adsorbent layers that sandwich the separating portion, the volume of the adsorbent layer located on the atmosphere port side may be made smaller than the volume of the other adsorbent layer.

In one form, in the region, a volume of the separating portion disposed closest to the atmosphere port may be made larger than a total of volumes of adsorbent layers that sandwich the separating portion therebetween.

In one form, in the region, volumes of the separating portions may be increased in accordance with proximity to the atmosphere port side.

In one form, in the region, an adsorbent layer located closest to the atmosphere port may be constituted by activated carbon having a butane working capacity of 14.5 g/dl or higher in accordance with ASTM D5228.

In one form, an adsorbent layer provided closest to a tank port may be constituted by crushed activated carbon.

In one form, the volume of the adsorbent layers in the region may be equal to or less than 12% of a total volume of the adsorbent layers in the evaporated fuel treatment apparatus.

In one form, a ratio between a cross-sectional area that is perpendicular to a circulation direction in the passage of the adsorbent layers in the region and a cross-sectional area that is perpendicular to the circulation direction in the passage of the main adsorbent layer may be included within a range of 1:2.5 to 1:4.5.

DETAILED DESCRIPTION OF THE PREFERRED EMBODIMENT

Modes for carrying out the present invention will now be described with reference to the accompanying drawings.

Embodiment 1

Figure 1:
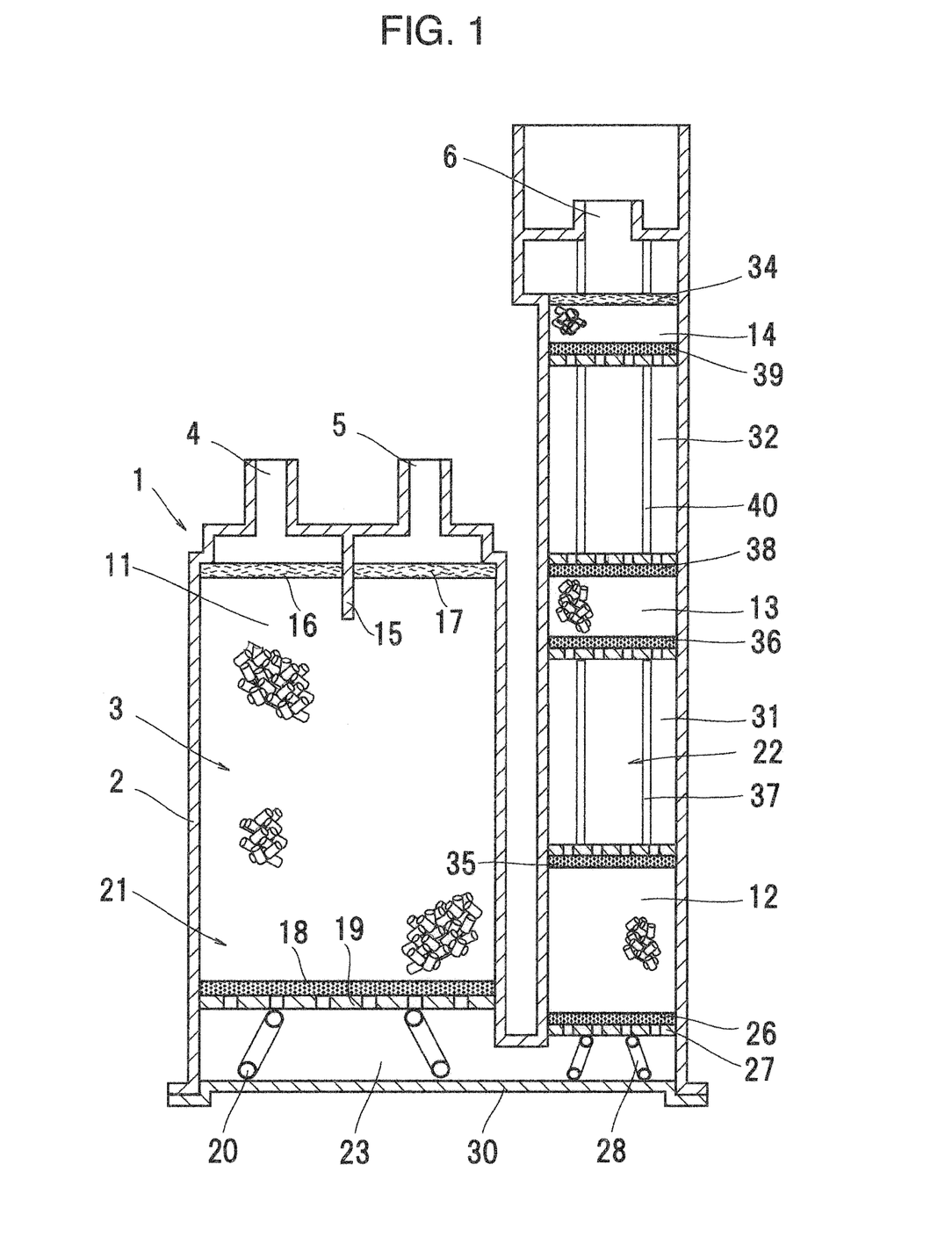
FIG. 1 is a schematic view for describing an evaporated fuel treatment apparatus according to Embodiment 1 of the present invention.

FIG. 1 illustrates Embodiment 1 according to the present invention.

As shown in FIG. 1, an evaporated fuel treatment apparatus 1 according to the present invention includes a casing 2. In the casing 2, a passage 3 circulating fluid is formed. A tank port 4 and a purge port 5 are formed at an end of the passage 3 in the casing 2, and an atmosphere port 6 is formed at the other end thereof.

In the passage 3, four adsorbent layers filled with adsorbent adsorbing evaporated fuel components, that is, a first adsorbent layer 11, a second adsorbent layer 12, a third adsorbent layer 13, and a fourth adsorbent layer 14, are arranged in series. In the present embodiment, activated carbon is used as the adsorbent.

As shown in FIG. 1, a main chamber 21 communicating with the tank port 4 and the purge port 5, and an auxiliary chamber 22 communicating with the atmosphere port 6 are formed in the casing 2. The main chamber 21 and the auxiliary chamber 22 are partitioned by partition walls. The main chamber 21 and the auxiliary chamber 22 communicate with each other through a space 23 formed in the casing 2 on a side opposite to the atmosphere port 6 side, so that when fluid flows in the passage 3, the fluid flows in a substantially U-shape by turning in the opposite direction in the space 23.

The tank port 4 communicates with an upper air chamber of a fuel tank (not shown). The purge port 5 is connected to an intake air passage of an engine through a purge control valve (VSV) (not shown). The degree of opening of the purge control valve is controlled by an electronic control unit (ECU), and purge control is performed based on measured values of an A/F sensor and the like during engine operation. The atmosphere port 6 communicates with the outside through a passage (not shown).

The first adsorbent layer 11 as the main adsorbent layer which has the largest volume among the four adsorbent layers 11 to 14 and in which activated carbon as the adsorbent is filled at a predetermined density is formed within the main chamber 21. Granulated activated carbon or crushed activated carbon can be used as the activated carbon, and crushed activated carbon is used in the present embodiment. Note that, in order that it can be easily understood that the first adsorbent layer 11 is constituted by activated carbon, granulated activated carbon is used for the illustration in the figures.

A baffle plate 15 which extends from an inner surface of the casing 2 to a part of the first adsorbent layer 11 is provided between the tank port 4 and the purge port 5 in the casing 2. The baffle plate 15 causes the fluid flowing between the tank port 4 and the purge port 5 to circulate through the first adsorbent layer 11.

The first adsorbent layer 11 is covered on the tank port 4 side with a filter 16 made of nonwoven fabric or the like, and on the purge port 5 side with a filter 17 made of nonwoven fabric or the like, respectively. In addition, a filter 18 made of urethane or the like is provided on a surface of the first adsorbent layer 11 on a side of the space 23 so as to cover the entire surface. A plate 19 having a large number of communicating holes is provided on the space 23 side of the filter 18. The plate 19 is urged toward the tank port 4 side by urging means 20 such as a spring.

The second adsorbent layer 12 in which activated carbon as the adsorbent is filled at a predetermined density is formed on the space 23 side of the auxiliary chamber 22. Granulated activated carbon or crushed activated carbon can be used as the activated carbon, and granulated activated carbon is used in the present embodiment.

A filter 26 made of urethane or the like is provided on the space 23 side of the second adsorbent layer 12 so as to cover the entire space 23 side of the second adsorbent layer 12. A plate 27 in which a large number of communicating holes are provided substantially uniformly over the entire surface thereof is provided on the space 23 side of the filter 26. The plate 27 is urged toward the atmosphere port 6 side by an urging member 28 such as a spring.

The space 23 is formed between the plates 19 and 27 and a cover plate 30 of the casing 2. The first adsorbent layer 11 and the second adsorbent layer 12 communicate with each other through the space 23.

The third adsorbent layer 13 in which activated carbon as the adsorbent is filled at a predetermined density is formed on the atmosphere port 6 side of the second adsorbent layer 12 in the auxiliary chamber 22. Granulated activated carbon or crushed activated carbon can be used as the activated carbon, and granulated activated carbon is used in the present embodiment.

A first separating portion 31 that separates the adsorbent layers 12 and 13 by a predetermined distance is provided between the end face on the atmosphere port 6 side of the second adsorbent layer 12 and the end face on the space 23 side of the third adsorbent layer 13. The shape of the first separating portion 31 is arbitrarily set.

Filters 35 and 36 made of urethane or the like are provided at an end on the second adsorbent layer 12 side and an end on the third adsorbent layer 13 side of the first separating portion 31, respectively, so as to cover the entire ends. A space forming member 37 that can separate the filters 35 and 36 by a predetermined distance is provided between the filters 35 and 36.

The fourth adsorbent layer 14 in which activated carbon as the adsorbent is filled at a predetermined density is formed on the atmosphere port 6 side of the third adsorbent layer 13 in the auxiliary chamber 22. Granulated activated carbon or crushed activated carbon can be used as the activated carbon, and high-performance activated carbon having a butane working capacity (BWC) of 14.5 g/dL or higher in accordance with ASTM D5228 is used in the present embodiment. Note that, activated carbon similar to the activated carbon which constitutes the second adsorbent layer 12 or the third adsorbent layer 13 may be used as the activated carbon constituting the fourth adsorbent layer 14. A filter 34 made of nonwoven fabric or the like is provided on the atmosphere port 6 side of the fourth adsorbent layer 14 so as to cover the entire end face thereof.

A second separating portion 32 that separates the adsorbent layers 13 and 14 by a predetermined distance is provided between the end face on the atmosphere port 6 side of the third adsorbent layer 13 and the end face on the space 23 side of the fourth adsorbent layer 14. The shape of the second separating portion 32 is arbitrarily set.

Filters 38 and 39 made of urethane or the like are provided at an end on the third adsorbent layer 13 side and an end on the fourth adsorbent layer 14 side of the second separating portion 32, respectively, so as to cover the entire ends. A space forming member 40 that can separate the filters 38 and 39 by a predetermined distance is provided between the filters 38 and 39.

Any adsorbent is not provided in the separating portions 31 and 32.

Note that, it is only necessary that the separating portions 31 and 32 can separate the adjacent adsorbent layers by a predetermined distance, and the separating portions 31 and 32 may be formed, for example, of only filters made of urethane or the like, or may be constituted by only the space forming members 37 and 40.

A volume $V\alpha$ of the second separating portion 32 that is the separating portion closest to the atmosphere port 6 is set to be larger than the total of a volume V3 of the third adsorbent layer 13 and a volume V4 of the fourth adsorbent layer 14 that are the adsorbent layers that sandwich the second separating portion 32 therebetween. The volume of the adsorbent layer on the atmosphere port 6 side is set so as to be the smaller volume among the volumes of the adsorbent layers that sandwich the second separating portion 32 therebetween. That is, the volume V4 of the fourth adsorbent layer 14 is set to be smaller than the volume V3 of the third adsorbent layer 13. In the present embodiment, the volume $V\square$ of the second separating portion 32 is set to 200 ml, the volume V4 of the fourth adsorbent layer 14 is set to 35 ml, and the volume V3 of the third adsorbent layer 13 is set to 45 ml.

The volumes of the separating portions in the auxiliary chamber 22 are set so as to increase in accordance with proximity to the atmosphere port 6 side. That is, the volume $V\alpha$ of the second separating portion 32 is set so as to be larger than a volume $V\beta$ of the first separating portion 31. In the present embodiment the volume $V\alpha$ of the second separating portion 32 is set to 200 ml and the volume $V\beta$ of the first separating portion 31 is set to 180 ml.

Further, the volumes of the adsorbent layers in the auxiliary chamber 22 are set so as to decrease in accordance with proximity to the atmosphere port 6 side. That is, the volume V4 of the fourth adsorbent layer 14 is set so as to be smaller than the volume V3 of the third adsorbent layer 13, and the volume V3 of the third adsorbent layer 13 is set so as to be smaller than a volume V2 of the second adsorbent layer 12. In the present embodiment, the volume V4 of the fourth adsorbent layer 14 is set to 35 ml, the volume V3 of the third adsorbent layer 13 is set to 45 ml, and the volume V2 of the second adsorbent layer 12 is set to 150 ml.

The volume $V\beta$ of the first separating portion 31 is set so as to be smaller than the total of the volume V2 of the second adsorbent layer 12 and the volume V3 of the third adsorbent layer 13 that are the adsorbent layers that sandwich the first separating portion 31.

In addition, the total of the volumes of the adsorbent layers 12, 13 and 14 within the auxiliary chamber 22 is set so as to be less than or equal to 12% of the total of the volumes of all the adsorbent layers in the evaporated fuel treatment apparatus 1. In the present embodiment, a volume V1 of the first adsorbent layer 11 is set to 2800 ml, and the total (V2+V3+V4) of the volumes of the adsorbent layers 12, 13, and 14 is set to 230 ml, and thus the total of the volumes of the adsorbent layers 12, 13, and 14 is set to 8.2% of the volume of the first adsorbent layer 11.

A ratio between a cross-sectional area that is perpendicular to the circulation direction in the passage 3 of the adsorbent layers 12, 13, and 14 in the auxiliary chamber 22 and a cross-sectional area that is perpendicular to the circulation direction in the passage 3 of the first adsorbent layer 11 in the main chamber 21 except for the region in the evaporated fuel treatment apparatus is set so as to be within a range of 1:2.5 to 1:4.5.

Note that, a configuration may also be adopted so that the respective cross-sectional areas of the second adsorbent layer 12, the third adsorbent layer 13, and the fourth adsorbent layer 14 in the direction perpendicular to the circulation direction in the passage 3 are all the same across the entire circulation direction of the passage 3, or so that the cross-sectional areas decrease towards the atmosphere port 6 side.

The region in the present invention corresponds to the auxiliary chamber 22 in Embodiment 1. According to the configuration of the present embodiment, gas containing evaporated fuel that has flowed into the evaporated fuel treatment apparatus 1 from the tank port 4 is released to the atmosphere from the atmosphere port 6 after fuel components are adsorbed by the adsorbent in the respective adsorbent layers 11 to 14.

On the other hand, at the time of purge control during engine operation, the purge control valve is opened by an electronic control unit (ECU), air that is sucked into the evaporated fuel treatment apparatus 1 from the atmosphere port 6 by a negative pressure in the intake air passage flows in an opposite direction to the direction described above, and is supplied to the intake air passage of the engine from the purge port 5. At such time, the fuel components that have been adsorbed by the adsorbent in the respective adsorbent layers 11 to 14 are desorbed and supplied to the engine together with the air.

With the above-described structure and configuration, the evaporated fuel treatment apparatus 1 of the present embodiment performs the following actions and obtains the following effects.

By making the volume $V\alpha$ of the second separating portion 32 that is the separating portion closest to the atmosphere port 6 larger than the total of the volume V3 of the third adsorbent layer 13 and the volume V4 of the fourth adsorbent layer 14 that are adsorbent layers that sandwich the second separating portion 32 therebetween, the residence time in the second separating portion 32 that is the separating portion closest to the atmosphere port 6 can be increased in comparison to the conventional canister. As a result, an amount of increase (recovery) in the temperature of gas that has passed through the fourth adsorbent layer 14 and for which a change in the gas temperature due to desorption is largest can be adequately secured, and the temperature of the gas flowing into the adjacent adsorbent layer can be made higher than that in the conventional canister and the performance with respect to desorbing fuel components of the adsorbent thereof can be maintained at a high level.

In addition, by making the volume $V\alpha$ of the second separating portion 32 that is the separating portion closest to the atmosphere port 6 larger than the total of the volume V3 of the third adsorbent layer 13 and the volume V4 of the fourth adsorbent layer 14 that are adsorbent layers that sandwich the second separating portion 32 therebetween, the volume of the second separating portion 32 which is close to the atmosphere port 6 can be adequately secured in correspondence to the volumes V3 and V4 of the adsorbent layers 13 and 14 that sandwich the second separating portion 32, diffusion of fuel components in the second separating portion 32 can be suppressed, and the amount of blow-by of fuel components to the atmosphere can be decreased and the blow-by performance can be improved in comparison with the conventional canister.

Further, the volumes of the adsorbent layers in the auxiliary chamber 22 are set so as to decrease in accordance with proximity to the atmosphere port 6. That is, by making the volume V4 of the fourth adsorbent layer 14 smaller than the volume V3 of the third adsorbent layer 13, and making the volume V3 of the third adsorbent layer 13 smaller than the volume V2 of the second adsorbent layer 12, the residual amount of fuel components after purging can be reduced, and the blow-by performance can be improved.

Embodiment 2

In Embodiment 1 a configuration is adopted in which the volume $V\beta$ of the first separating portion 31 is made smaller than the total of the volume V2 of the second adsorbent layer 12 and the volume V3 of the third adsorbent layer 13 that are the adsorbent layers that sandwich the first separating portion 31. However, a configuration may also be adopted in which the volume $V\beta$ of the first separating portion 31 is set so as to be larger than the sum total of the volume V2 of the second adsorbent layer 12 and the volume V3 of the third adsorbent layer 13 that are the adsorbent layers that sandwich the first separating portion 31.

For example, with respect to the configuration shown in FIG. 1, the volume $V\alpha$ of the second separating portion 32 is set to 200 ml, the volume $V\beta$ of the first separating portion 31 is set to 180 ml, a volume Vγ of the space 23 is set to 410 ml, the volume V4 of the fourth adsorbent layer 14 is set to 30 ml, the volume V3 of the third adsorbent layer 13 is set to 40 ml, the volume V2 of the second adsorbent layer 12 is set to 120 ml, and the volume V1 of the first adsorbent layer 11 is set to 2050 ml.

Since the remaining structure is the same as in Embodiment 1, a description thereof is omitted here.

In addition, the same actions and effects as in Embodiment 1 are also obtained in Embodiment 2.

In addition, by adopting the configuration in which the volume Vβ of the first separating portion 31 is made larger than the total of the volumes V2 and V3 of the adsorbent layers 12 and 13 that sandwich the first separating portion 31 therebetween, in comparison with Embodiment 1, diffusion of fuel components in the first separating portion 31 can be suppressed more, and the amount of blow-by of fuel components to the atmosphere can be further reduced, thereby, further improving the blow-by performance.

Embodiment 3

Figure 2:
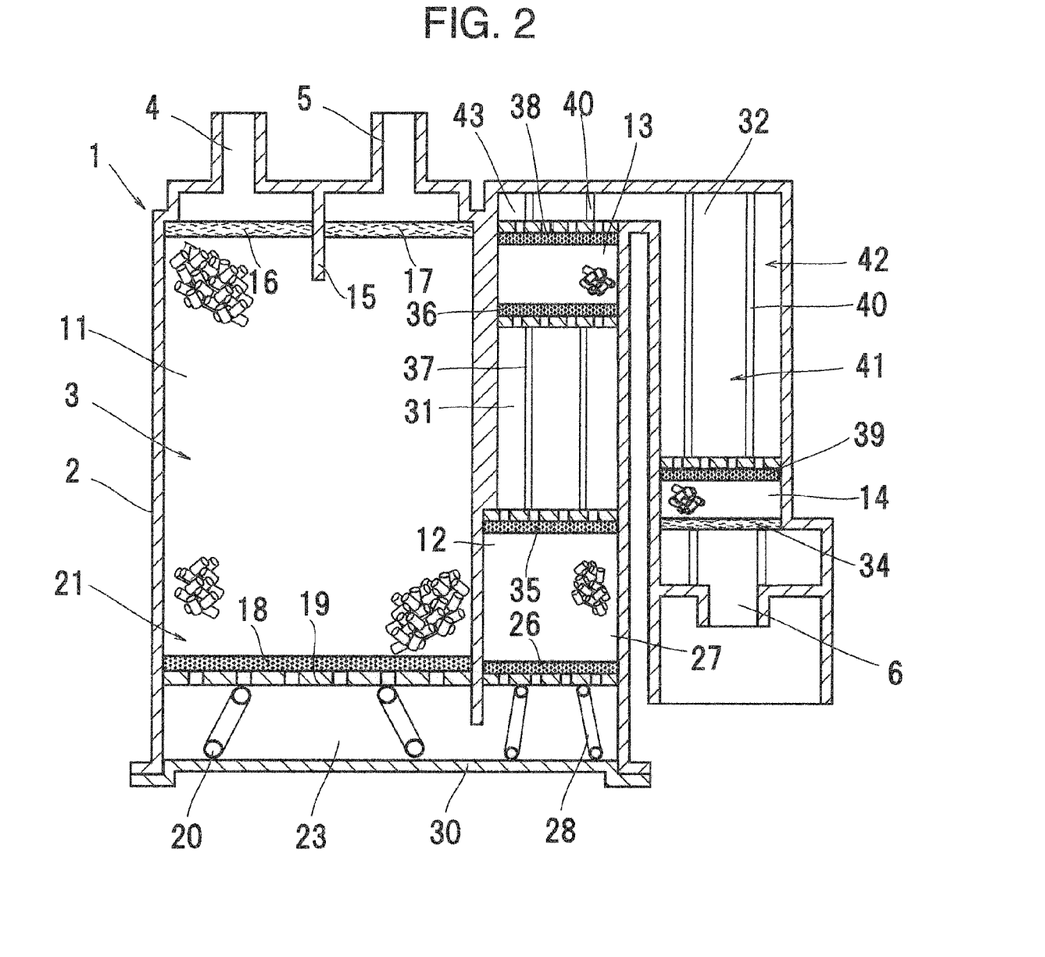
FIG. 2 is a schematic view for describing an evaporated fuel treatment apparatus according to Embodiment 3 of the present invention.

In Embodiments 1 and 2, the U-shaped passage 3 that is turned in the opposite direction once in the space 23 is formed in the casing 2. However, for example, as shown in FIG. 2, the passage in the casing 2 may also be configured as a passage 41 that is formed in an N-shape that is turned in the opposite direction twice in the casing 2.

The structure of the main chamber 21 of Embodiment 3 is the same as that of the main chamber 21 in Embodiments 1 and 2.

In Embodiment 3, an auxiliary chamber 42 that corresponds to the region of the present invention is formed in a U-shape that is turned in the opposite direction in a space 43. One end of the auxiliary chamber 42 communicates with the space 23, and the atmosphere port 6 is provided at the other end thereof.

The second adsorbent layer 12 and the third adsorbent layer 13 that are the same as in Embodiment 1 are provided between the spaces 23 and 43 in the auxiliary chamber 42. The first separating portion 31 is provided between the second adsorbent layer 12 and the third adsorbent layer 13. The fourth adsorbent layer 14 that is the same as the fourth adsorbent layer 14 of Embodiment 1 is provided on the atmosphere port 6 side of the space 43. The second separating portion 32 is provided between the fourth adsorbent layer 14 and the third adsorbent layer 13.

Mutual relations between the adsorbent layers 11, 12, 13, and 14 and the separating portions 31 and 32 are set in a similar manner to Embodiments 1 and 2.

Since the remaining structure is the same as those in Embodiments 1 and 2, like components are denoted by like reference numerals and a description of such components is omitted here.

In addition, Embodiment 3 can also obtain the same operations and effects as in Embodiments 1 and 2.

Embodiment 4

In above Embodiments 1 to 3, the passages 3 and 41 are formed in a U-shape or an N-shape. However, the shape of the respective passages may be changed. For example, as shown in FIG. 3, the passages may be configured as a passage 51 that is formed in a W-shape that is turned in the opposite direction three times in the casing 2.

Figure 3:
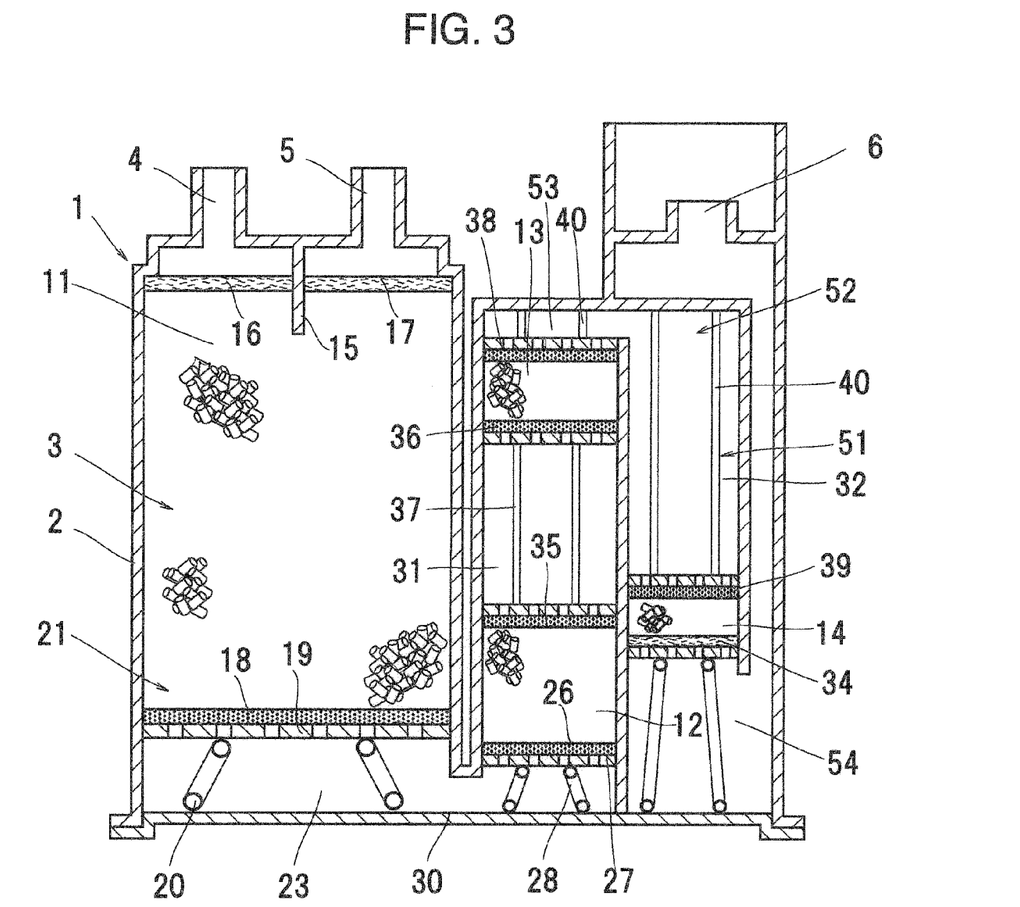
FIG. 3 is a schematic view for describing an evaporated fuel treatment apparatus according to Embodiment 4 of the present invention.

The structure of the main chamber 21 of Embodiment 4 according to the invention as shown in FIG. 3 is the same as the main chamber 21 of Embodiments 1 and 2. In Embodiment 4, an auxiliary chamber 52 that corresponds to the region of the present invention is formed in an N-shape that is turned in the opposite direction twice in spaces 53 and 54. One end of the auxiliary chamber 52 communicates with the space 23, and the atmosphere port 6 is provided at the other end thereof.

The second adsorbent layer 12 and the third adsorbent layer 13 that are the same as those in Embodiments 1 and 2 are provided between the spaces 23 and 53 in the auxiliary chamber 52. The first separating portion 31 is provided between the second adsorbent layer 12 and the third adsorbent layer 13. The fourth adsorbent layer 14 that is the same as the fourth adsorbent layer 14 of Embodiment 1 is provided between the spaces 53 and 54. The second separating portion 32 is provided between the fourth adsorbent layer 14 and the third adsorbent layer 13.

The mutual relations between the adsorbent layers 11, 12, 13, and 14 and the separating portions 31 and 32 are set in a similar manner to Embodiments 1 and 2.

Since the remaining structure is the same as that in Embodiments 1 and 2, like components are denoted by like reference numerals and a description of such components is omitted here.

In addition, Embodiment 4 can obtain the same operations and effects as those in Embodiments 1 and 2.

Embodiment 5

In Embodiments 1 and 2, the passage 3 in the casing 2 is formed in a U-shape that is turned in the reverse direction once in the space 23. However, for example, as shown in FIG. 4, the passage in the casing may also be formed in an I-shape that does not turn in the reverse direction.

Figure 4:
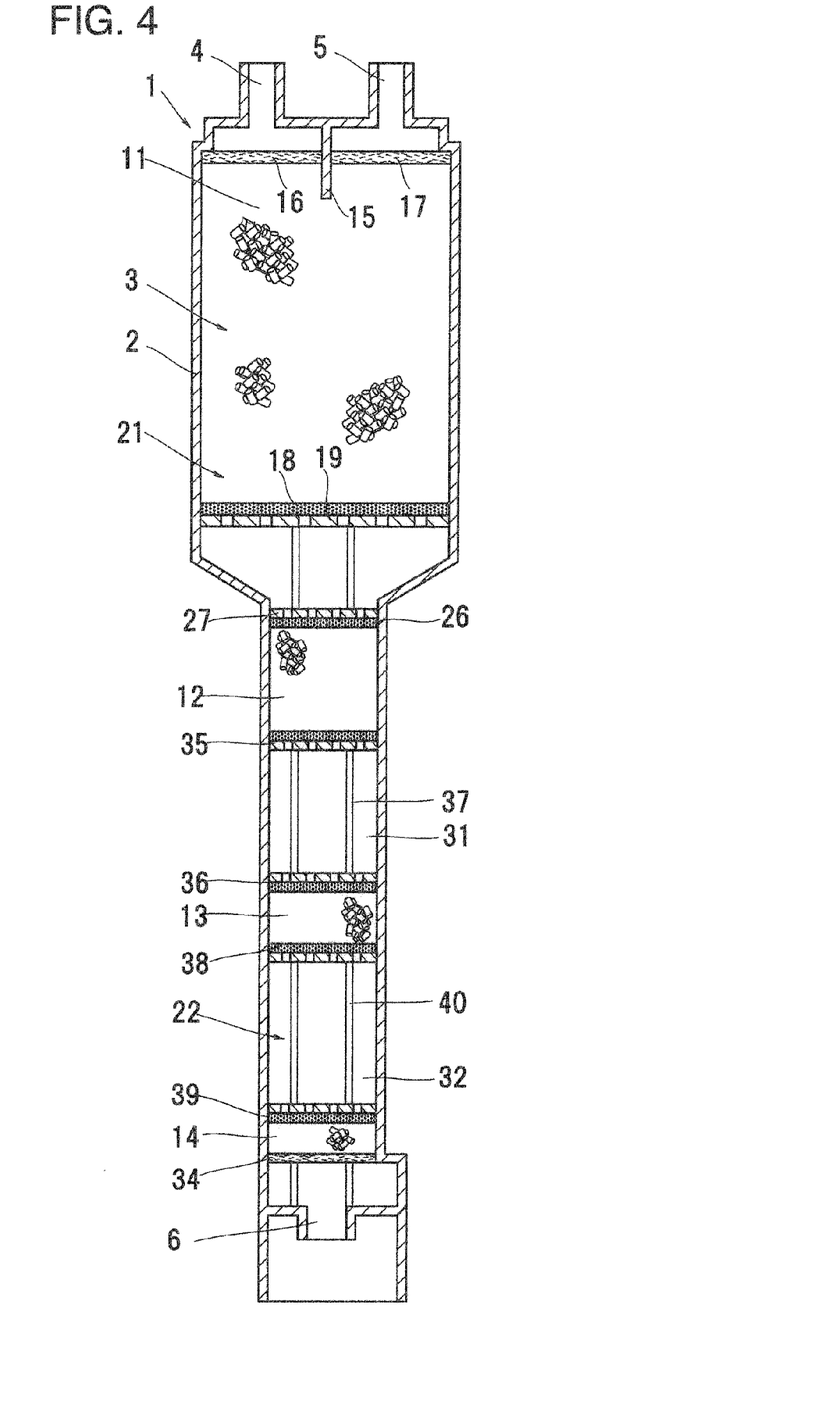
FIG. 4 is a schematic view for describing an evaporated fuel treatment apparatus according to Embodiment 5 of the present invention.

For example, as shown in FIG. 4, Embodiment 5 is an embodiment in which the present invention is applied to an evaporated fuel treatment apparatus in which a main chamber 21 and an auxiliary chamber 22 are linearly arranged without turning in the reverse direction in a space.

In Embodiment 5 also, a configuration is adopted that includes three adsorbent layers and separating portions that separate the adjacent adsorbent layers, in which the volumes of the adsorbent layers decrease in accordance with proximity of the adsorbent layers to the atmosphere port 6, and the volumes of the separating portions increase in accordance with proximity of the separating portions to the atmosphere port 6. The volume of the separating portion closest to the atmosphere port 6 is configured to be larger than the total of the volumes of the adsorbent layers that sandwich the separating portion therebetween. Further, the auxiliary chamber that is the region is provided on the atmosphere port 6 side of the first adsorbent layer 11 that is the main adsorbent layer.

In addition, preferably, the volume of each of the separating portions provided in the auxiliary chamber that is the region is set so as to be larger than the total of the volumes of the adsorbent layers that sandwich the relevant separating portion.

The mutual relations between the adsorbent layers 11, 12, 13, and 14 and the separating portions 31 and 32 are set in a similar manner to that in Embodiments 1 and 2.

Since the remaining structure is the same as those in Embodiments 1 and 2, like components are denoted by like reference numerals and a description of such components is omitted here.

In addition, Embodiment 5 can also obtain the same operations and effects as those in Embodiments 1 and 2.

Embodiment 6

Figure 5:
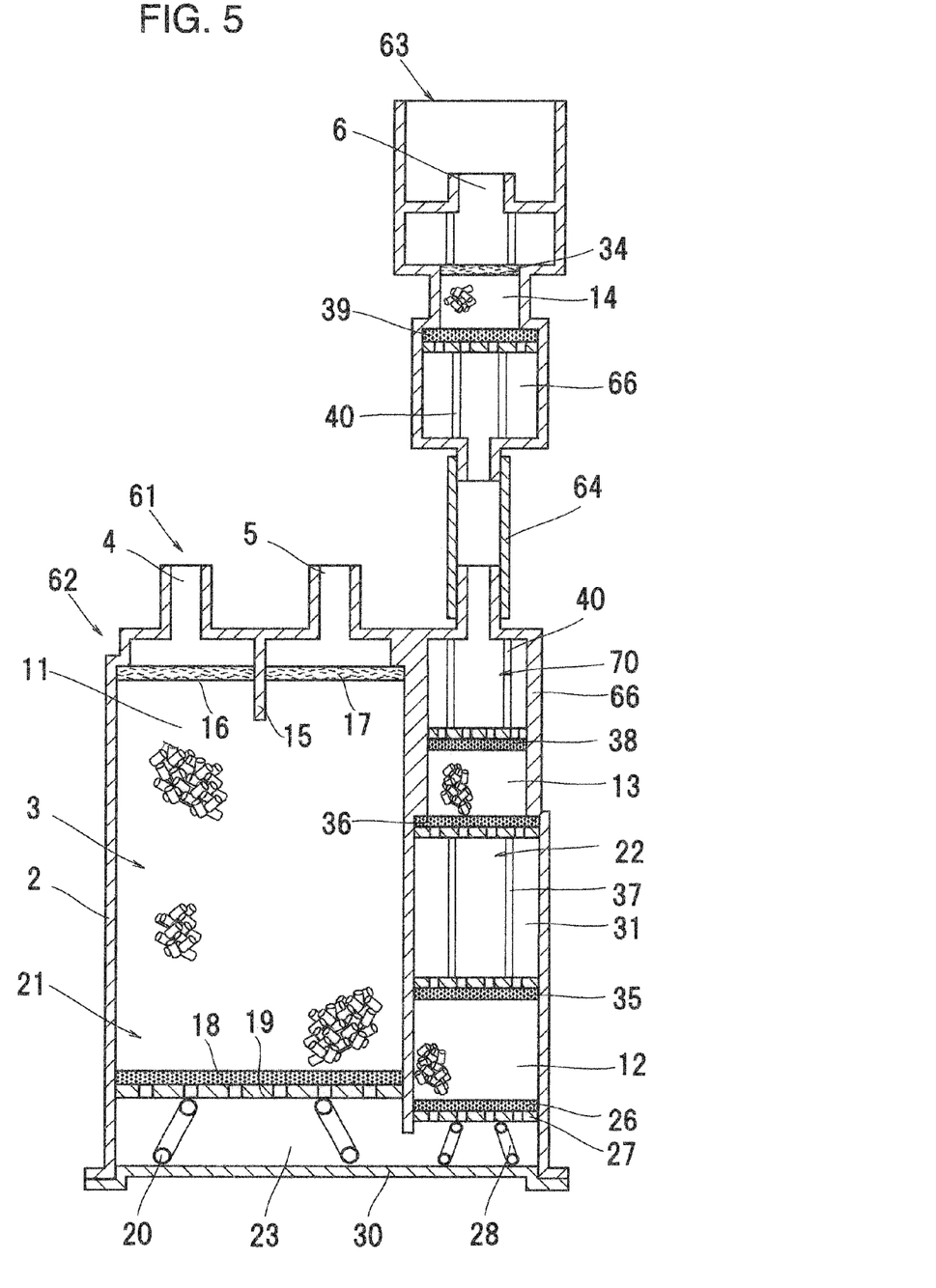
FIG. 5 is a schematic view for describing an evaporated fuel treatment apparatus according to Embodiment 6 of the present invention.

FIG. 5 illustrates an example of Embodiment 6 according to the present invention.

An evaporated fuel treatment apparatus 61 of Embodiment 6 includes a main body canister 62 and a sub-canister 63. The main body canister 62 and the sub-canister 63 communicate with each other through a communicating tube 64.

Similarly to Embodiment 1, the main chamber 21 and the auxiliary chamber 22 are formed in the main body canister 62. The first adsorbent layer 11 is provided in the main chamber 21, and the second adsorbent layer 12 and the third adsorbent layer 13 that are the same as those in Embodiment 1 are provided in the auxiliary chamber 22. The first separating portion 31 is provided between the second adsorbent layer 12 and the third adsorbent layer 13. The fourth adsorbent layer 14 that is the same as that in Embodiment 1 is provided in the sub-canister 63. A second separating portion 66 is formed between the third adsorbent layer 13 and the fourth adsorbent layer 14 across the auxiliary chamber 22 and the sub-canister 63.

In Embodiment 6, a section 70 obtained by combining the auxiliary chamber 22 in the main body canister 62 and the sub-canister 63 corresponds to the region of the present invention.

The mutual relations between the adsorbent layers 11, 12, 13, and 14 and the separating portions 31 and 66 are set in a similar manner to that in Embodiments 1 and 2.

In Embodiment 6, because a cross-sectional area perpendicular to the circulation direction of the passage 3 within the communicating tube 64 is small, the flow rate increases at that portion and the residence time in that portion is shortened. Hence, it is preferable that the adsorbent layers 11, 12, 13, and 14 and the separating portions 31 and 66 are formed so that the mutual relations of Embodiments 1 and 2 are established by using a volume that excludes the volume inside the communicating tube 64, preferably a volume that excludes the volume of the portion of the passage 3 at which the cross-sectional area perpendicular to the circulation direction of the passage 3 is smaller than a cross-sectional area of the atmosphere port 6, as the volume of the second separating portion 66 that separates the third adsorbent layer 13 and the fourth adsorbent layer 14.

Since the remaining structure is the same as those in Embodiments 1 and 2, a description thereof is omitted here.

In addition, Embodiment 6 can obtain the same operations and effects as those in Embodiments 1 and 2.

Other Embodiments

In Embodiments 1 to 6, only the first adsorbent layer 11 that is the main adsorbent layer is provided in the main chamber 21. However, a configuration may also be adopted in which a plurality of adsorbent layers is provided in the main chamber 21, and a separating portion is provided between adjacent adsorbent layers to separate the adjacent adsorbent layers.

Further, four or more adsorbent layers may be provided in series in the regions 22, 42, 52, and 70, and separating portions that separate the respective adsorbent layers may be provided between adjacent adsorbent layers. In such a case, the volume of at least one separating portion in the region is set so as to be larger than the total of the volumes of the two adsorbent layers sandwiching the separating portion therebetween, and the volumes of the adsorbent layers are set so that the volume of the adsorbent layer closer to the atmosphere port is smaller than the volume of the other one.

Preferably, the volume of the separating portion located closest to the atmosphere port is set so as to be larger than the total of the volumes of the two adsorbent layers sandwiching the separating portion therebetween, and the volumes of the two adsorbent layers are set so that the volume of the adsorbent layer closer to the atmosphere port is smaller than that of the other one.

In addition, it is preferable that the volumes of the separating portions in the region increase in accordance with proximity to the atmosphere port 6. Further, as long as a region that has three or more adsorbent layers that are different from the main adsorbent layer and separating portions that separate the adjacent adsorbent layers, and in which the volume of at least one separating portion is larger than the total of the volumes of the two adsorbent layers sandwiching the relevant separating portion therebetween is provided on the atmosphere port 6 side of the main adsorbent layer, the overall shape of the evaporated fuel treatment apparatus, and the number, the shape and the arrangement and the like of the adsorbent layers, separating portions, and spaces and the like can be arbitrarily set.

The foregoing disclosure of specific embodiments is intended to be illustrative of the broad concepts comprehended by the invention.

The invention claimed is:

1. An evaporated fuel treatment apparatus in which a passage circulating fluid inside is formed, a tank port and a purge port are formed at one end of the passage, an atmosphere port is formed at the other end of the passage, and at least four adsorbent layers in which adsorbent adsorbing fuel components is filled are provided in the passage,
the evaporated fuel treatment apparatus characterized of having a main adsorbent layer and a region that is provided on an atmosphere port side of the main adsorbent layer,
wherein:
at least three adsorbent layers that are different from the main adsorbent layer, and separating portions separating adjacent ones in the adsorbent layers are provided in the region; and
a volume of at least one separating portion in the region is made larger than a total of volumes of the adsorbent layers that sandwich the separating portion therebetween.

2. The evaporated fuel treatment apparatus according to claim 1, wherein, with respect to two adsorbent layers that sandwich therebetween a separating portion that has a volume that is made larger than a total of the volumes of the adsorbent layers that sandwich the separating portion, the volume of the adsorbent layer located on the atmosphere port side is made smaller than the volume of the other adsorbent layer.

3. The evaporated fuel treatment apparatus according to claim 1, wherein, in the region, a volume of a separating portion that is disposed closest to the atmosphere port is made larger than a total of volumes of adsorbent layers that sandwich the separating portion therebetween.

4. The evaporated fuel treatment apparatus according to claim 1, wherein, in the region, volumes of the separating portions are increased in accordance with proximity to the atmosphere port side.

5. The evaporated fuel treatment apparatus according to claim 1, wherein, in the region, an adsorbent layer located closest to the atmosphere port side is constituted by activated carbon having a butane working capacity of 14.5 g/dl or higher in accordance with ASTM D5228.

6. The evaporated fuel treatment apparatus according to claim 1, wherein an adsorbent layer provided closest to a tank port is constituted by crushed activated carbon.

7. The evaporated fuel treatment apparatus according to claim 1, wherein the volume of the adsorbent layers in the region is equal to or less than 12% of a total volume of the adsorbent layers in the evaporated fuel treatment apparatus.

8. The evaporated fuel treatment apparatus according to claim 1, wherein a ratio between a cross-sectional area that is perpendicular to a circulation direction in the passage of the adsorbent layers in the region and a cross-sectional area that is perpendicular to the circulation direction in the passage of the main adsorbent layer is included within a range of 1:2.5 to 1:4.5.

* * * * *